Dec. 11, 1956  T. BARISH  2,773,427
HOBBING MACHINE
Filed April 9, 1949  4 Sheets-Sheet 1

INVENTOR.
THOMAS BARISH
BY Hudson, Boughton,
Williams, David & Hoffmann.
ATTORNEYS Dec. 11, 1956     T. BARISH     2,773,427
HOBBING MACHINE
Filed April 9, 1949     4 Sheets-Sheet 3

INVENTOR.
THOMAS BARISH
BY Hudson, Boughton,
Williams, David & Hoffmann.
ATTORNEYS United States Patent Office 2,773,427
Patented Dec. 11, 1956

2,773,427

HOBBING MACHINE

Thomas Barish, Washington, D. C., assignor to The Cleveland Hobbing Machine Company, Cleveland, Ohio, a corporation of Ohio Application April 9, 1949, Serial No. 86,482

2 Claims. (Cl. 90—4)

The present invention relates to hobbing machines and, more particularly, to hobbing machines of the axial feed type as distinguished from tangential feed type hobbing machines.

In the operation of hobbing machines of the axial feed type, it has heretofore been customary to periodically advance the hob, that is move the hob tangentially of the work spindle after a number of blanks have been cut so as to bring a new section of the hob into cutting position. This practice does not make full use of the hob since, in order to insure that an entirely new section thereof is in cutting position, it is necessary to leave an unused portion between the section that has just been used and the next section to be utilized. These portions intermediate successive settings have performed no, or very little, cutting so that the wear, etc., incident to the cutting operation being performed is not uniformly distributed over the usable or effective length of the hob. More recently the hob has been continuously advanced or moved tangentially of the work during the cutting operation in such a manner that the hob is advanced an amount equal to its usable or effective length once during some relatively long period of time, such as a work day, a half day, or the like. At the end of each period the mechanism is returned to its original position, the hob is reground, or replaced if necessary, and the cycle is repeated.

The principal object of the present invention is to provide a hob head for a hobbing machine of the character referred to, which hob head comprises an axially shiftable hob arbor, a shift-producing member fixed against axial movement and connected to the hob arbor by means for effecting a continuous axial shaft of the hob arbor relative to the shift-producing member upon relative rotation therebetween in combination with gearing consisting of two pairs of intermeshing gears rotatable about common axes with the coaxial gears being of substantially the same size but of different diametral pitches for effecting a slow, relative rotation between the hob arbor and the shift-producing member upon rotation of the former.

The invention further resides in certain novel features of construction, and combinations and arrangements of parts, and further objects and advantages thereof will be apparent to those skilled in the art to which it pertains from the following description of the present preferred embodiment thereof, described with respect to the accompanying drawings in which similar reference characters represent corresponding parts in the several views and in which.

Figure 1:
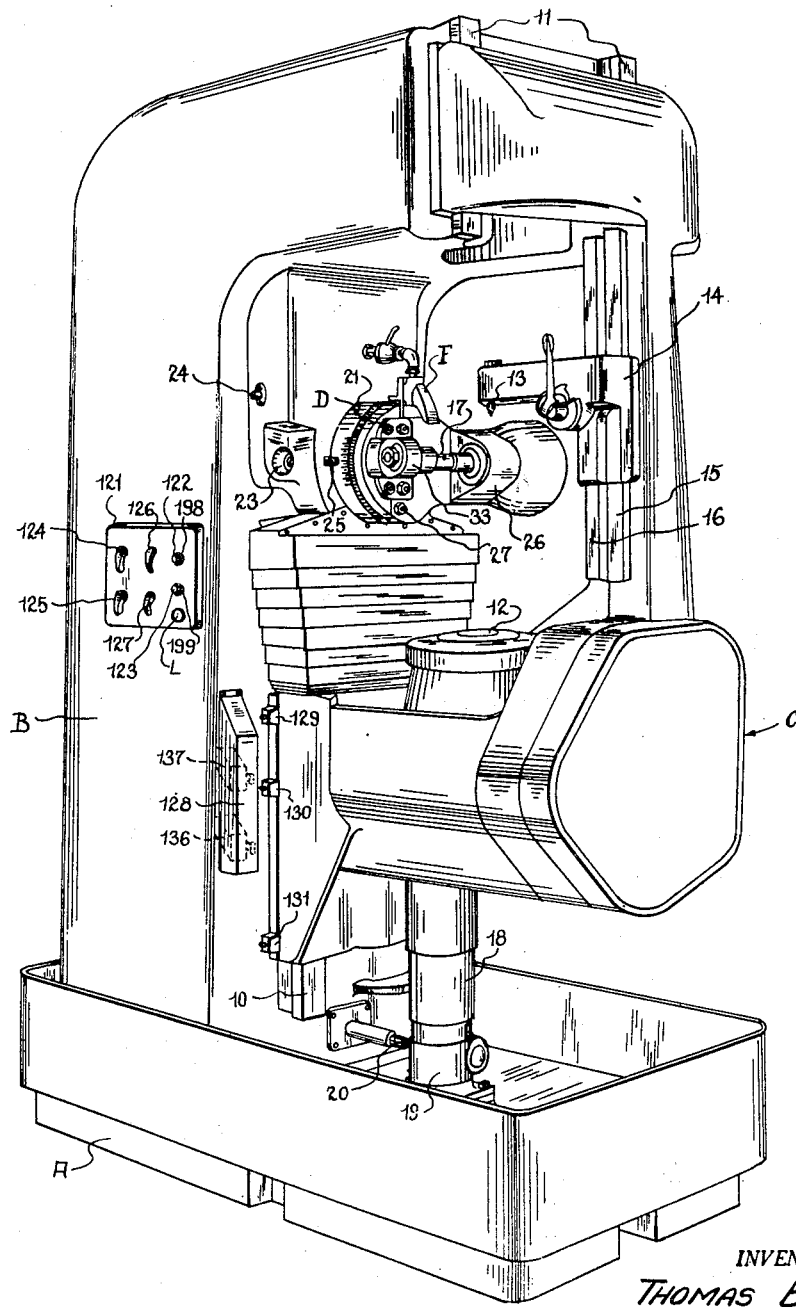
Fig. 1 is a perspective view of a hobbing machine embodying the present invention.

Although the invention is susceptible of various modifications and alternative constructions, it is herein shown and described as incorporated in a hobbing machine similar to that shown in United States Patent No. 2,307,428, issued January 5, 1943. In the present machine, however, the shape of the machine is slightly different from that in the patent, some of the electrical control devices have been relocated, and the hob head is carried by a member slidably supported in a cylindrical aperture in the vertical column or frame rather than being supported on horizontal ways.

Generally speaking, the machine is of vertical construction and comprises a base A, a vertical column or gooseneck B supported upon the base A, a work head C vertically movable upon vertically spaced pairs of ways 10, 11 on the column B, and a tool or hob head D carried by a cylindrical member slidably supported in a horizontal cylindrical aperture in the column B and adjustable therein toward and from the work head. The work, which may be a gear blank, a shaft to be splined, or the like, is adapted to be rotatably supported in the work head C by having one end supported in a chuck or some other suitable means, not shown, attached to the upper end of the work spindle 12. The other end of the work is engaged and supported by a tail center 13 carried by a tail slide 14, the latter being supported for vertical movement toward and from the work spindle upon ways 15, 16 formed on the work head.

The hob spindle or arbor 17 is rotatably supported in the hob head D, in a manner hereinafter more specifically described, and during operation of the machine is rotated in timed relation to the rotation of the work spindle 12 by a "cut" motor located in the lower part of the column B and operatively connected to the respective spindles in a manner similar to that disclosed in the aforesaid patent and hence is not here shown nor described in detail. The hob head D is preferably provided with a conventional means F for supplying a cutting fluid to the hob and work.

The work head C is adapted to be reciprocated along the vertically spaced pairs of ways 10, 11, to cause a work blank carried by the work head to be moved axially past a hob fixed to the hob arbor 17 and to return the work head to its initial position, by a cooperating lead screw and nut rotatably connected to the work head C and the base A, respectively. The lead screw is located within the chip guard 18 and is driven at a relatively slow speed in timed relation to the rotation of the hob and work spindles from the work spindle drive. The nut is rotatably supported in a housing 19, bolted to the base A, and is adapted to be rotated at a relatively high speed through the medium of a worm and worm wheel drive by a high speed, reversible traverse motor located within the column B and connected thereto by the shaft 20. These mechanisms are likewise similar to those shown in the aforementioned patent to which reference is had for the details thereof.

The cylindrical member 21 which carries the hob head D is slidably supported in a cylindrical aperture in the column B and is concentric with respect to the main drive shaft 22 of the machine. The member 21 is adapted to be moved longitudinally within the cylindrical aperture by means of a screw 23 to effect adjustment of thet hob toward and from the work spindle, the member 21 being clamped in any adjusted position by a clamp mechanism actuated by a clamp screw 24 and being prevented from rotating in the cylindrical aperture by a key 25. The hob head D comprises a hob head housing 26 having a cylindrical portion 26a projecting into a cylindrical aperture in the front end of the member 21 and through the medium of which the housing 26 and, in turn, the hob head D are rotatably connected to the front end of the member 21 concentric with the axis of the shaft 22. The hob head D is adapted to be secured in any desired angular position by bolts 27, the heads of which engage within a circular T-groove 28 in the front face of the member 21.

Figure 2:
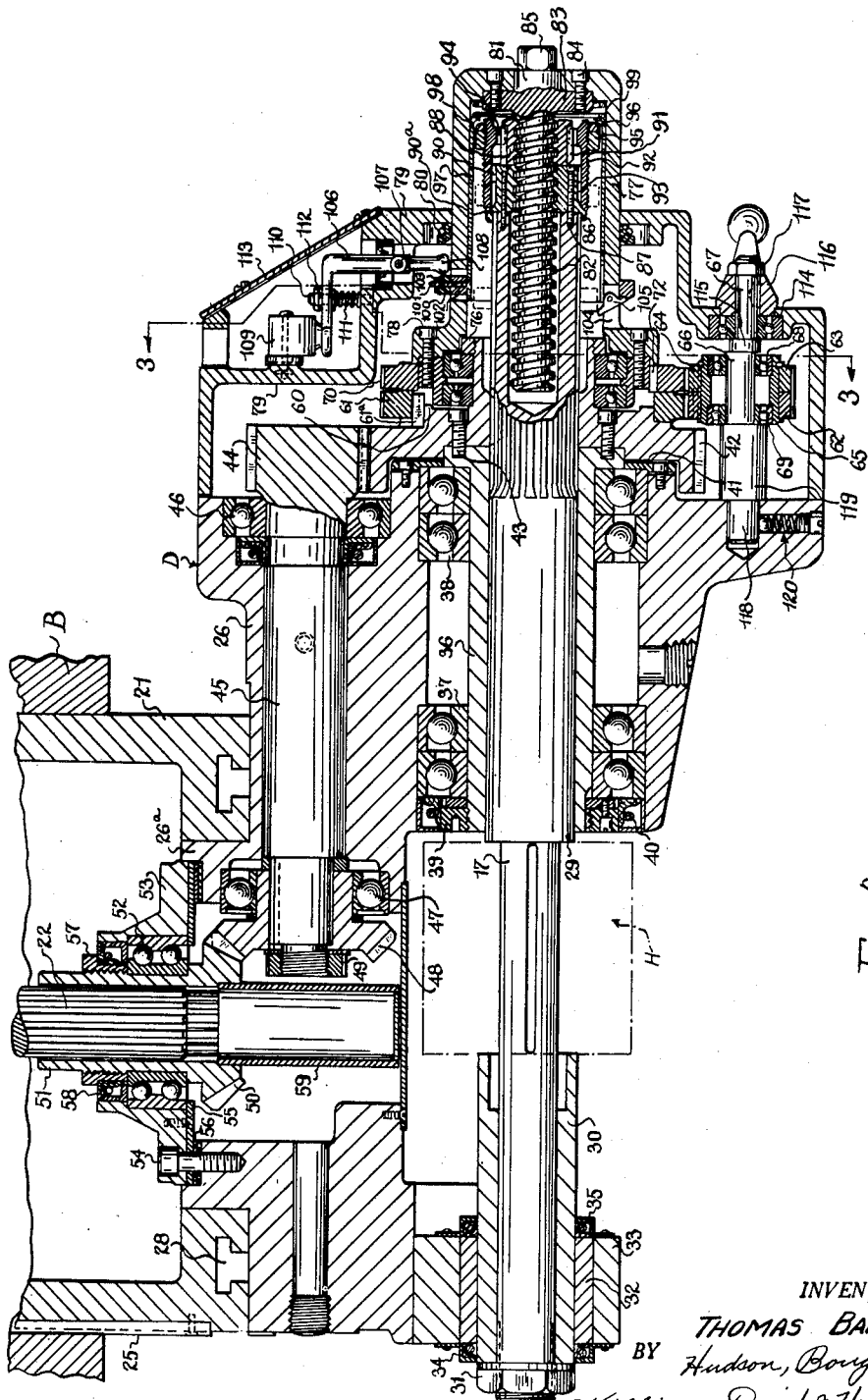
Fig. 2 is a sectional view, with portions in elevation, through the center line of the hob head and approximately on the line 2—2 of Fig. 3.

The hob H, which is indicated by broken lines in Fig. 2, is keyed to the arbor 17 intermediate a shoulder 29, formed on the arbor by a change in its diameter, and a sleeve 30 which is retained on the arbor by a nut 31 provided on the threaded outer end of the arbor. Hobs of different lengths may be utilized by employing a spacing washer or sleeve between the hob and the shoulder 29 and/or by utilizing a sleeve 30 of different length from that shown.

The sleeve 30 is slidably and rotatably supported in a bushing 32 provided in an outboard support 33 which is attached to the hob housing 26, the bushing being held from axial movement by combined retainers and oil seals 34 and 35. The arbor 17, to the right of the hob as viewed in Fig. 2, is slidably supported in a sleeve 36. This sleeve is rotatably supported in the hob head housing 26 by pairs of antifriction bearings 37 and 38. The bearings 37 are retained in place between a shoulder in the housing 26 and a nut and washer assembly 39 secured to the outer end of the sleeve 36, an oil seal 40 being interposed between the nut and washer assembly and the adjacent surface of the housing 26. The bearings 38 are retained in place between a shoulder in the housing 26 and a plate 41 secured to the housing by machine screws or the like.

The right-hand portion of the hob arbor or spindle 17, as viewed in Fig. 2, is splined and slidably keyed thereto is a hob arbor gear 42 which is connected to an external flange on the right-hand end of the sleeve 36 by machine screws 43. The gear 42 is continuously in mesh with a hob drive pinion 44 formed on the right-hand end of a shaft 45 which is rotatably supported in the housing 26 by antifriction bearings 46 and 47. The left-hand end of the shaft 45 has a bevel gear 48 keyed thereto, the gear being held in place by a nut 49 on the threaded end of the shaft 45. The gear 48 is continuously in mesh with a bevel drive gear 50 which has an elongated splined hub 51 in which is received the splined end portion of the drive shaft 22. The hub 51 of the gear 50 is rotatably supported by a pair of antifriction bearings 52 mounted in a bearing cap or member 53 which is connected by screws 54 to the rear end of the cylindrical portion 26a of the housing 26, a bearing retaining plate 55 and shims 56 being interposed between the bearing cap and the hob head housing. The rear portion of the inner race of the bearings 52 is engaged by a nut 57 threaded upon the hub 51 of the gear 50 and a suitable oil retainer or seal 58 is provided between the nut 57 and the rear portion of the bearing cap 53. The bearings 52 and their retainers cooperate with the gear 50 to prevent axial displacement of the latter, the hob head housing 26 and the cylindrical member 21, however, being movable axially of the drive shaft 22 to permit adjustment of the hob head toward and from the work spindle. The gear 50 is provided with a cylindrical shaft seal 59 to protect the end of the drive shaft 22, when it projects forwardly of the gear 50, and to prevent the entrance of foreign matter into the splines of the gear and shaft.

As mentioned heretofore, the hob arbor or spindle 17, in addition to its rotation, is given a slow axial movement or advance. For this purpose the hub of the gear 42 is elongated and has a stepped portion 60 on which a gear 61 is supported, the gears 42 and 61 being connected for rotation together by a key 61a. The gear 61 meshes with a gear 62 which is connected to rotate with a gear 63 by means of a pin or rod 64 extending through the two last-mentioned gears. The gears 62 and 63 are supported upon a bushing 65, which, in turn, is rotatably supported upon a cylindrical portion 66 of a shaft 67 by antifriction bearings 68 and 69. The portion 66 is eccentrically disposed with respect to the axis of the shaft 67 so that the gears 62 and 63 may be placed in mesh with or disengaged from the gears 61 and 70 respectively as hereinafter described.

The gear 70, which is adapted to mesh with the gear 63, is mounted upon a bearing retaining ring 71 the ring being connected for rotation with the gear 70 by a key 72. The bearing retaining ring 71, and hence the gear 70, are journalled for rotation upon a reduced diameter portion 73 of the hub of the gear 42 by antifriction bearings 74 and 75, the bearings being held in place by a nut 76 screwed upon the threaded end of the said reduced diameter portion 73, see Fig. 4. The bearing ring 71 has a hollow cylindrical cap member 77 connected thereto by machine screws 78 which extend through a flange of the cap member and are screwed into tapped holes in the ring 71. The outer end of this cap member 77 projects through an opening in an end cover 79 for the hob head housing 26, an oil seal 80 preferably surrounding the cap member adjacent the opening through the cover 79.

The outer end of the cap member 77 is apertured to receive a cylindrical portion 81 of a hob arbor shifting screw 82 which extends within the cap member and is freely received in an axial bore provided in the adjacent end of the hob arbor or spindle 17. A flange 83 is provided intermediate the threads of the screw 82 and the cylindrical portion 81 thereof. This flange is disposed within a recess in the inner face of the end of the cap member 77 and is secured thereto by screws such as 84 so that the hob shift screw 82 is rotatable with the cap member 77 and the gear 70. Exteriorly of the cap member the hob shifting screw 82 is provided with a polygonally-shaped portion 85 which is adapted to be engaged by a wrench or other tool for actuation of the mechanism when returning the hob arbor or spindle to its initial position as hereinafter described.

Figure 4:
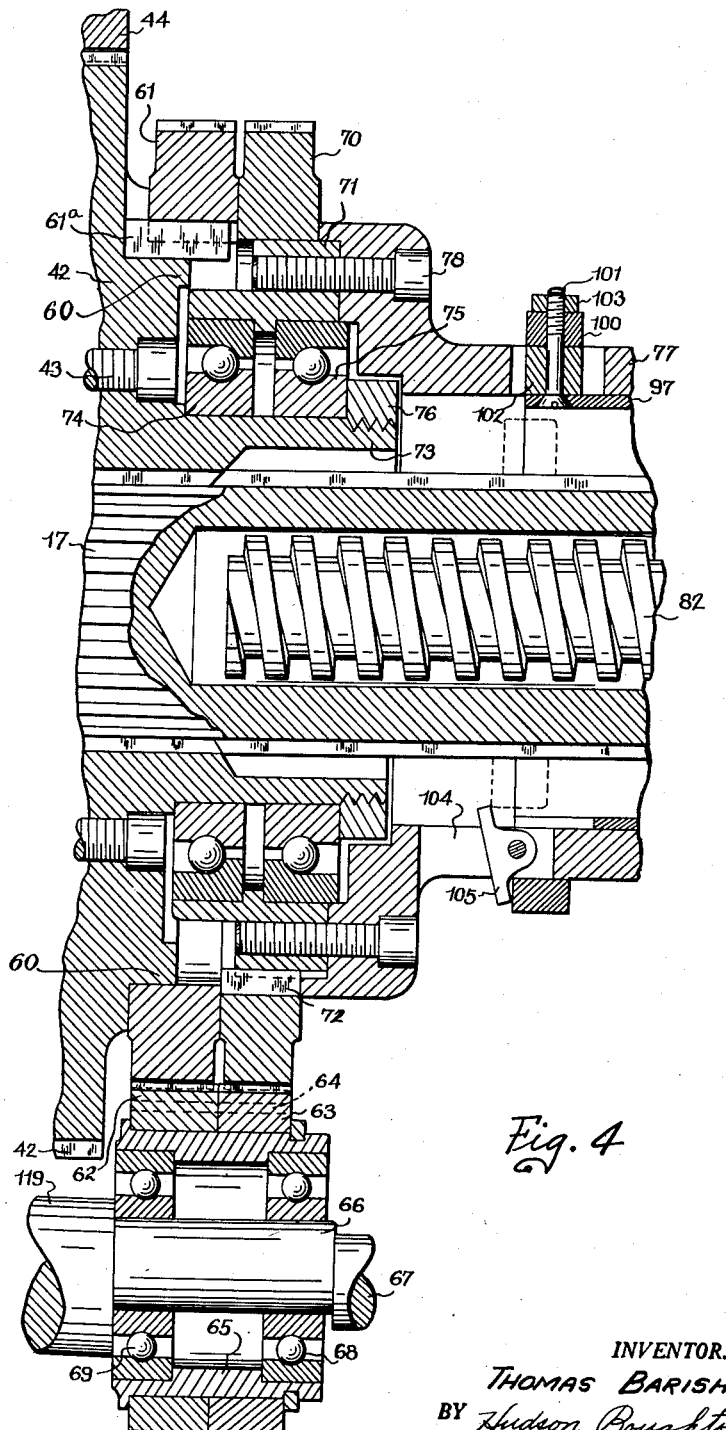

Threadably engaged with the hob shifting screw 82 is a nut member 86 which is secured by screws 87 to the adjacent end of the hob arbor 17. Also threaded upon the hob shifting screw 82, and disposed intermediate the nut 86 and flange 83, is a second nut member 88. The outer peripheries of the nut members 86 and 88 are provided with splines or gear teeth 90 and 91, respectively. Surrounding the peripheries of the nut members 86 and 88 is an adjusting lock gear 92, the interior of which is provided with two spaced series of gear teeth or splines 93 and 94 cooperating, respectively, with the gear teeth or splines 90, 91 on the nut members 86, 88 so that the two nut members are held from relative displacement during operation of the mechanism. The nut 88 and the lock gear 92 cooperate with the nut 86 to provide a means for preventing back lash between the threads of the screw 82 and of the nut 86. To effect adjustment of these parts, the lock gear 92 is moved axially until the gear teeth or splines 90, 93 on the nut 86 and the lock gear 92 are disengaged, the gear teeth or splines 91, 94 on the nut 88 and the lock gear, however, remaining in engagement. The lock gear 92 is then rotated, while the screw 82 is held stationary, until there is no back lash between the screw and the nuts whereupon the lock gear is axially moved to the position as shown in Figs. 2 and 4 so that the gear teeth or splines 90, 93 are reengaged. Since the gear teeth or splines 91, 94 remain in engagement, and since the nut 86 is connected to the hob arbor, the adjusted position of the nut 88 relative to the nut 86 is retained. To facilitate this adjustment, the nut 86 may be provided with grooves 90a, which are extensions of the grooves or spaces between the teeth or splines on the nut 86, and the lock gear 92 may be provided with one or more longitudinal marks or grooves so that the extent of relative rotation between the lock gear 92 and the nut 86 during adjustment may be readily determined.

The outer periphery of the lock gear 92 is threaded, and screwed thereon is a pair of control rings or nut members 95 and 96 the bores of which are threaded to cooperate with the threads on the lock gear 92 so that the ring or nut members may be disposed at any positions along the length of the member 92. Preferably, however, the nut or ring member 96 remains adjacent the rear or right-hand end of the lock gear 92 while the ring or nut member 95 is adjusted to various positions axially of the lock gear to provide for control of the machine in response to different predetermined axial distances of movement of the hob arbor as hereinafter described.

Slidably disposed upon the inner cylindrical surface of the cap member 77 is a relatively thin cylindrical sleeve 97 the end portion of which, adjacent the closed end of the cap member 77 is turned inwardly to provide a flange 98. This flange forms an abutment for one end of a compression spring 99, the other end of which bears against the inner face of the end of cap member 77, the spring 99 being normally uncompressed as indicated in Fig. 2. The cap member 77 adjacent the inner or unflanged end of the sleeve 97 is provided with a plurality of radial openings or slots. A feed control ring 100 is slidably disposed exteriorly of the cap member 77 and is connected with the sleeve member 97 by flat-headed screws 101 which extend outwardly from the sleeve member 97 passing through bushings 102 between the sleeve 97 and ring 100, the outer ends of the screws being provided with nuts 103. The diameters of the bushings 102 are such that they have a sliding fit within the elongated slots in which they are disposed so that the sleeve member is constrained to rotate with the cap member and in addition can move axially relative thereto a limited extent.

The cap member 77 is also provided with a plurality of slots 104, of which one only is shown in Fig. 2, in which levers 105 are pivotally mounted with one end of the levers extending into contact with the control ring 100. The other ends of the levers 105 extend inwardly of the bore of cap member 77 and into the path of movement of the ring or nut member 95, which in its advanced position, i. e., the extreme left-hand position indicated in broken lines in Figs. 2 and 4, is adapted to engage the levers and rock the latter.

The cover member 79 is provided with a radial opening through which passes a portion of a bent lever 106, the lever being provided with a pivot pin 107 which is supported in this opening of the housing 79. The inner or lower end of the lever 106, as viewed in Figs. 2 and 4, is provided with a somewhat spherical enlarged portion or knob 108 which is adapted to engage the control ring 100. The portion of the lever on the other side of the pivot 107, and exteriorly of the housing 79, is bent at substantially right angles and has a portion thereof engaging the actuating pin or member of a microswitch 109 which is adjustably supported upon the housing 79. Intermediate the point of engagement of switch 109 with the lever 106 and the susbtantially vertical portion of the latter, the lever is provided with an elongated slot through which passes a pin 110. The lower end of this pin is secured to the adjacent outer surface of the housing 79 and between the said housing and the lever is disposed a compression spring 111, the outer end of the pin 110 being threaded and provided with nuts 112. The construction just described is such that the spring 111 continuously urges the lever 106 to the position as shown in Fig. 2, but the lever may rock about its pivot 107 when the ring 100 moves to the right as viewed in this figure, thereby operating the switch 109. The switch 109 and the portion of the lever 106 exteriorly of the housing 79 are preferably enclosed by suitable cover plates such as 113.

It will now be apparent that rotation of the drive shaft 22 is transmitted through the bevel gears 50 and 48, thus rotating the shaft 45 and pinion 44 and the latter drives the gear 42 thereby rotating the hob arbor 17 and the hob H attached thereto. In addition, this rotation of the gear 42 drives the gear 61 which, in turn, causes the gears 62 and 63 to rotate since the former is connected to the latter. Consequently, the gear 70, the cap member 77, and the feed screw 82 are rotated. The speed of rotation of the feed screw 82 is equal to that of the hob arbor plus or minus a very small increment so that feed screw rotates relative to the hob arbor or spindle 17 at a very slow rate thereby causing the latter to be moved axially through the sleeve 36 due to the action of the nuts 86 and 88. As the hob spindle thus moves axially it carries therewith the control rings or nuts 95 and 96. When the hob arbor has moved axially a sufficient distance to dispose the control ring or nut 95 in its extreme left-hand, broken line position, as shown in Fig. 2, it engages the levers 105, rocking the latter counterclockwise, as viewed in this figure, thus forcing the ring 100 and hence the sleeve 97 to the right against the force of the compression spring 99. This movement of the control ring 100 rocks the lever 106 counterclockwise about its pivot 107, thereby actuating the switch 109.

The switch 109 is connected in the control circuit for the machine so as to stop the operation of the latter at the completion of the hobbing operation and light a signal lamp L indicating that the hob has advanced to its predetermined position and must be replaced or reground. The extent of the shift of the hob and its spindle prior to actuation of the switch 109 may be adjusted by adjusting the position of the control nut 95 upon the adjusting lock gear 92, the limits of this adjustment for the illustrated machine being indicated by the full and broken line positions of this ring or nut member adjacent the extremities of the threads on the member 92. The control circuit for the machine is illustrated and described in United States Patent No. 2,629,290, issued February 24, 1953, upon the copending application of Otis E. Staples and Anthony J. Bent, S. N. 56,726, filed October 27, 1948. This application also contains claims to the novel features of the actuating mechanism for the switch 109, exclusive of novel nature of the gearing for effecting the slow axial movement of the hob and which is claimed herein.

As mentioned heretofore, the advance of the hob arbor, and the hob carried thereby, is extremely slow and yet this is effected by a minimum of gears in an extremely compact arrangement thus keeping the dimensions of the hob head within the limits of the space available therefor in its various adjusted positions. In the illustrated embodiment, but four gears, rotatable on but two axes, are necessary to accomplish the desired rate of rotation of screw 82 relative to the arbor 17. As shown, the gears 61 and 70 are substantially the same size and are coaxial with the hob arbor. The gears 62 and 63, which are connected together and mesh respectively with the gears 61 and 70, rotate about a second axis parallel with the arbor. The gears 62 and 63 are of substantially the same size but are considerably smaller than the gears 61 and 70.

As will hereinafter appear, the gears 61 and 62 have the same diametral pitch, likewise the gears 63 and 70 have the same diametral pitch but these two diametral pitches are unequal. The ratio of the number of teeth on at least one of the pairs of meshing gears 61, 62 and 63, 70 is not a whole number. That is to say, the quotient of the number of teeth on the gear 61 by the number of teeth on the gear 62, for example, is equal to a whole number plus or minus a small integer. The sign, whether plus or minus, depends upon the hand of the thread on the screw 82 and upon whether the mechanism is adapted to shift the hob arbor to the right or to the left.

The following considerations more fully indicate the nature of the gear train. Let:

$N_1$ = the number of teeth on gear 61,
$n_1$ = the number of teeth on gear 62,
$N_2$ = the number of teeth on gear 70,
$n_2$ = the number of teeth on gear 63, and Δ = the differential rotation of screw 82 relative to the arbor 17 for each revolution of the latter.

Then, $$\frac{\text{R. P. M. of screw}}{\text{R. P. M. of arbor}} = \frac{N_1 n_2}{n_1 N_2} = 1 \pm \Delta$$

The quantity $1+\Delta$ indicates a gearing train such that the screw 82 rotates slightly faster than the arbor 17 thereby feeding the latter in one direction while the quantity $1-\Delta$ indicates that the screw rotates slightly slower than the arbor 17 thus feeding the latter in the opposite direction when the hand of the thread on screw 82 is the same in both cases.

In the case of two conventional meshing gears their pitch circles touch at a common tangent and twice the distance between their centers is equal to the sum of the numbers of their teeth divided by their pitch. Moreover, the velocity ratio, which is the quotient of the number of teeth on one such gear by the number of teeth on the other, is an integer. However, in the present mechanism, the requirement of a very small relative rotation between the screw 82 and arbor 17 makes it desirable that the number of teeth on $N_1$ not be exactly divisible by the number of teeth on $n_1$ but, instead, one revolution of $N_1$ should produce V revolutions of $n_1$ plus or minus a small number of teeth. That is:

$$N_1 = V n_1 \pm K$$

where V is the velocity ratio for conventional meshing gears having substantially the same pitch diameters as $N_1$ and $n_1$, and K represents the aforementioned small number of teeth. Likewise:

$$N_2 = V n_2 \pm K$$

The necessary difference in number of teeth of gear 61 with respect to gear 62 and of gear 70 with respect to gear 63 can be achieved for a fixed distance between the centers of arbor 17 and shaft 67 by employing involute teeth and altering the pitch diameters slightly so that the theoretical pitch circles are no longer in contact. This is possible since involute gears will operate properly so long as they mesh even though their theoretical pitch circles do not touch. Therefore:

$$\frac{N_1 + n_1 + M}{P_1} = 2 \text{ C. D.}$$

where C. D. is the distance between centers of arbor 17 and shaft 67, $P_1$ is the diametral pitch of gears 61 and 62, and M is a small integer. In order to secure the desired large reduction in the train M must ordinarily be less than 4. The same consideration with respect to gears 70 and 63 gives $$\frac{N_2 + n_2 + M}{P_2} = 2 \text{ C. D.}$$

where $P_2$ is the diametral pitch of gears 70 and 63.

It will also be apparent that, since gears 61, 70 have a common axis, and gears 62, 63 have a second common axis and the velocity ratio of the train is to be $1 \pm \Delta$, then:

$$N_2 = N_1 + X$$

and $$n_2 = n_1 + Y$$

where X and Y are small integers. This last relationship is made possible by the differential nature of the gear train which, as mentioned before, is achieved by having the diametral pitch of gears 70, 63 different from that of gears 61, 62. That is:

$$P_2 = P_1 + Z$$

where $P_1$ is the diametral pitch of gears 61, 62 and $P_2$ is the diametral pitch of gears 70, 63, and Z a small number which is usually an integer.

By way of example of the application of the above relationships, one practical embodiment of the mechanism has a distance of four (4) inches between the centers of the arbor 17 and shaft 67, and has V in the above relationships of the gears equal to 3. Hence, $$N_1 = 3n_1 \pm K$$

$$N_2 = 3n_2 \pm K$$

$$\frac{N_1 + n_1 + M}{P_1} = 2 \text{ C. D.} = 8$$

$$\frac{N_2 + n_2 + M}{P_2} = 8$$

When employing this mechanism to effect a very small additional rotation of the screw 82 for each revolution of the hob arbor:

$$\frac{N_1 n_2}{n_1 N_2} = 1 + \Delta$$

$$N_1 = 3n_1 + K$$

and $$N_2 = 3n_2 + K$$

When the screw 82 is to be rotated a very small amount short of a complete revolution for each revolution of the hob arbor, then:

$$\frac{N_1 n_2}{n_1 N_2} = 1 - \Delta$$

$$N_1 = 3n_1 - K$$

and $$N_2 = 3n_2 - K$$

In one embodiment of the mechanism having the characteristics mentioned above it was desired that the screw 82 be given an axial shift of ten millionths of an inch for each revolution of the hob arbor. In that embodiment, the screw 82 had ten threads to the inch and hence $\Delta$ had to be in the neighborhood of .0001. Accordingly, K and Z were given their smallest integer values; namely $K=1$, $Z=1$, hence:

$$\frac{N_1 n_2}{n_1 N_2} = 1.0001$$

$$N_1 = 3n_1 + 1$$
$$N_2 = 3n_2 + 1$$

and $$P_2 = P_1 + 1$$

Therefore:

$$N_1 + n_1 + M = 8P_1$$

and $$N_2 + n_2 + M = 8P_2 = 8P_1 + 8$$

so that $$N_1 + n_1 - N_2 - n_2 = -8$$

Moreover, since $$N_2 = N_1 + X$$

and $$n_2 = n_1 + Y$$

therefore $$N_1 + n_1 - N_1 - X - n_1 - Y = -8$$

or $$X + Y = 8$$

Also since $$N_2 = 3n_2 + 1$$

therefore $$N_1 + X = 3n_1 + 3Y + 1$$

Substituting for $N_1$ the value $3n_1 + 1$, gives $$3n_1 + 1 + X = 3n_1 + 3Y + 1$$

or $$X = 3Y$$

That is, $$3Y + Y = 8$$
$$Y = 2$$

and $$X = 6$$

The equation $$\frac{N_1 n_2}{n_1 N_2} = 1.0001$$

may now be solved to determine the value of $n_1$ as follows:

$$\frac{N_1(n_1+2)}{n_1(N_1+6)} = 1.0001$$

$$\frac{(3n_1+1)(n_1+2)}{n_1(3n_1+7)} = 1.0001$$

$$\frac{3n_1^2+7n_1+2}{3n_1^2+7n_1} = 1.0001$$

or $$.0003n_1^2 + .0007n - 2 = 0$$

$$(.0003n_1 + .02485)(n_1 - 80.5) = 0$$

$$n_1 = 80.5$$

Since $n_1$ must equal a whole number of teeth the above value is rounded off to $n_1 = 81$.

Hence $$N_1 = 3n_1 + 1 = 243 + 1 = 244$$
$$N_2 = N_1 + X = 244 + 6 = 250$$

and, $$n_2 = n_1 + Y = 81 + 2 = 83$$

also, since $$N_1 + n_1 + M = 8P_1$$

$$\frac{244 + 81 + M}{8} = P_1$$

or $$\frac{325}{8} = P_1 - \frac{M}{8}$$

$$40.625 = P_1 - \frac{M}{8}$$

Since $M$ is a small integer preferably less than 4 and $P_1$ is preferably an integer, then $$P_1 = 41$$

and $$M = 3$$

while $$P_2 = 41 + 1 = 42$$

With the same values of C. D., V, K, and Z it can likewise be shown that, to produce hob shifts of various amounts of correspondingly small order but by having the screw 82 rotate a very small amount short of a complete revolution for each revolution of the hob arbor, then $$N_1 = 3n_1 - 1$$
$$N_2 = 3n_2 - 1$$
$$P_2 = P_1 + 1$$
$$N_2 = N_1 + X = N_1 + 6$$
$$N_2 = n_1 + Y = n_1 + 2$$

and $$\frac{N_1 n_2}{n_1 N_2} = 1 - \Delta$$

Hence, $$\frac{N_1(n_1+2)}{n_1(N_1+6)} = 1 - \Delta$$

$$\frac{(3n_1-1)(n_1+2)}{n_1(3n_1+5)} = 1 - \Delta$$

$$\frac{3n_1^2 + 5n_1 - 2}{3n_1^2 + 5n_1} = 1 - \Delta$$

or $$3n_1^2 \Delta + 5n_1 \Delta - 2 = 0$$

Therefore, for a given value of $\Delta$ the sizes of the gears 61, 62, 63, and 70, as well as their pitches, can be readily determined.

In addition to the gear train calculated above, the following may be mentioned by way of example as being readily utilized with the same center distance. To effect five millionths of an inch shift of the hob arbor per revolution thereof:

$$N_1 = 344 \text{ teeth}$$
$$n_1 = 115 \text{ teeth}$$ 58 pitch
$$N_2 = 350 \text{ teeth}$$
$$n_2 = 117 \text{ teeth}$$ 59 pitch To effect fifteen millionths of an inch shift of the hob arbor per revolution thereof:

$$N_1 = 197 \text{ teeth}$$
$$n_1 = 66 \text{ teeth}$$ 33 pitch
$$N_2 = 203 \text{ teeth}$$
$$n_2 = 68 \text{ teeth}$$ 34 pitch To effect twenty millionths of an inch shift of the hob arbor per revolution thereof:

$$N_1 = 161 \text{ teeth}$$
$$n_1 = 54 \text{ teeth}$$ 27 pitch
$$N_2 = 167 \text{ teeth}$$
$$n_2 = 56 \text{ teeth}$$ 28 pitch To effect thirty millionths of an inch shift of the hob arbor per revolution thereof:

$$N_1 = 137 \text{ teeth}$$
$$n_1 = 46 \text{ teeth}$$ 23 pitch
$$N_2 = 143 \text{ teeth}$$
$$n_2 = 48 \text{ teeth}$$ 24 pitch It will be understood that the above calculations and ratios are given only as illustrations and that the invention is not limited to use of the specific gears mentioned nor to a central distance of four inches between the axes of the hob arbor and the shaft 67. Nor is it always necessary to employ V in the above equations equal to 3 although this value is highly advantageous since it provides a very compact mechanism while retaining the desired relationship of the gears and permitting the use of a large diameter hob arbor. Moreover, in certain applications it is not necessary that $P_1$ and $P_2$ have integer values.

It will now be apparent that, by suitable adjustment of the control ring or nut 95 upon the lock gear 92, the length of time required for the hob arbor to move axially to the position for actuation of the switch 109 can be made equal to the length of a work shift or any desired relatively long interval of time so that the machine may be serviced in its normal idle time and its productive time is not interrupted. Moreover, since the hop is being continuously advanced, the wear on its surface is equally distributed thereover so that the hobs will perform satisfactory service for longer periods of time than when they are adjusted intermittently as previously mentioned. The rate of hob advance and its direction for a given screw 82 may be readily selected by substituting for the gears 61, 62, 63 and 70 others having different numbers of teeth.

As stated above, the gears 62 and 63 are journalled upon an intermediate portion of the shaft 67 which is eccentric with respect to the axis of that shaft. To the right of the eccentric portion 66, as viewed in Fig. 2, the shaft 67 has a concentric portion of reduced diameter which is journalled in the cover member 79 by antifriction bearing 114, a collar 115 being disposed between the bearing 114 and the eccentric portion of the shaft. Exteriorly of the cover member 79, the shaft 67 has a handle member 116 keyed thereto, the outer end of the shaft 67 being threaded and provided with a nut 117 to retain the handle in place. The inner, or left-hand, portion 118 of the shaft 67 is concentric and is journalled in a bore provided in the housing 26 and between the portions 66 and 118 the shaft 67 has a concentric portion 119 of larger diameter forming shoulders abutting the housing 26 and the bearing 69.

The portion 118 of the shaft 67 is provided with two recesses spaced 180° apart with which a spring pressed ball detent 120 selectively cooperates to retain the shaft in either of two positions corresponding with the engaged and disengaged positions of gears 62 and 63 with respect to the gears 61 and 70. That is, with the handle 116 disposed as illustrated in Fig. 2, the eccentric portion 66 of shaft 67 is at its uppermost position so that the gears 62 and 63 are engaged with the gears 61 and 70. Therefore, rotation of the hob arbor or spindle 17 will cause the latter to be slowly moved or shifted axially. When the hob arbor has moved axially the predetermined distance, as determined by the setting of the control nut 95, the switch 109 is actuated, terminating operation of the machine and lighting the signal lamp L.

The operator then rocks the handle 116 through 180° to the second position thereof thus disposing the eccentric portion at its lowermost position and disengaging the gears 62 and 63 from the gears 61 and 70 thereby interrupting the driving connections between the hob arbor 17 and the hob shifting screw 82. A wrench or other tool may then be applied to the polygonally shaped portion 85 of screw 82 and the latter, together with the hob arbor returned to their initial position. When the hob arbor has reached its extreme right-hand position, as viewed in Fig. 2, the ring or nut 96 engages the flange 98 of the sleeve 97. This slightly compresses the spring 99, moving the feed control ring 100 sufficiently to actuate the switch 109, thereby relighting the indicating lamp L. The hob arbor is then moved in the opposite direction, that is, to the left as viewed in Fig. 2, until the lamp L is extinguished. This represents the position in which the ring or nut 96 has moved from engagement with the flange 98 so that the spring 99 is no longer compressed and hence the control ring 100 is so disposed that the lever 106 returns to its initial position under influence of the spring 111.

In the event the advance of the hob arbor to its extreme forward or left-hand position, as shown in Fig. 2, has occurred at a time such that the machine is conditioned to begin a cutting or hobbing operation which has been prevented by the actuation of switch 109, the circuit to the cut motor should be opened before returning the hob arbor to its initial position in order to insure that the machine will not automatically resume operations before the hob has been replaced and properly positioned. Even though the operation of the machine is stopped by switch 109 at the end of a hobbing operation and before the machine is conditioned for a new operation, it is good practice to open the circuit to the cut motor while returning the hob arbor to its initial position.

Figure 3:
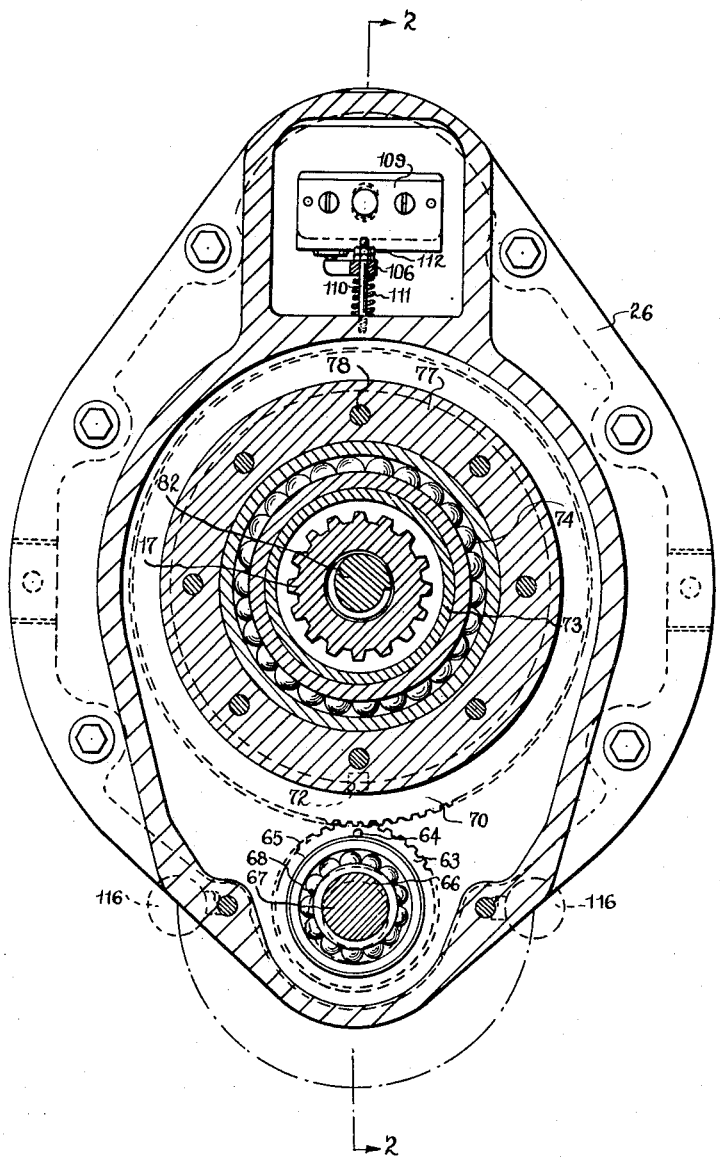
Fig. 3 is a sectional view substantially on the line 3—3 of Fig. 2, with certain parts in elevation; and, Fig. 4 is an enlarged fragmentary sectional view of a portion of Fig. 2 more clearly illustrating the differential pitch gearing for axially shifting the hob.

When the hob arbor has been returned to its initial position, the handle 116 is again rocked through 180° thus reengaging the gears 62 and 63 with the gears 61 and 70. The circuit to the cut motor is then restored and operation of the machine may then be resumed. The spring detent 120 holds the shaft 67, and hence the gears 62 and 63, in either of the two above-described positions after being moved thereto by the operator rocking the handle 116 through an arc of 180°, the two positions of the handle being indicated by broken lines in Fig. 3.

The operation of the machine is electrically controlled, the details thereof being fully described and claimed in the aforementioned Staples et al., Patent No. 2,629,290. It is sufficient here to note that the vertical column B of the machine is provided with a control panel 121 having a start switch 122, a stop switch 123, a switch 124 for controlling the direction of rotation of the hob and work, a "job selector" switch 125 for controlling the direction of the operating cycle, a "feed on-off" switch 126, and a switch 127 for automatically terminating the feed prior to stopping the rotation of the work and hob. The start and stop switches are preferably of the push button type, while the switches 124, 125, 126 and 127 are multiple contacts thereof. Adjacent the lower ways 10 of the machine is a housing 128 which is provided with a work head travel controlled switch 136 operated by the adjustable stop 129 and a second work head travel control switch 137 operated by the adjustable stops 130 and 131 carried by the lower portion of the work head. The other side of the work head is preferably provided with two spaced stops or abutments, not shown, adapted to actuate an overtravel limit switch mounted on the column B.

Briefly stated the operation of the machine is as follows: A work blank is positioned in the work head, being held by a chuck on the work spindle 12 and by the tail center 13, and the machine is then started by pushing the start button 122. This energizes the rapid traverse motor, not shown, which is connected with the shaft 20, thus causing relatively rapid vertical movement of the work head C to bring the work adjacent the hob H. Just prior to the time the work engages the hob, the stop member 129 actuates a switch in the housing 128, stopping the rapid traverse motor and starting the cut motor, which is not shown but is operatively connected to the shaft 22. The cut motor rotates the shaft 22 and hence rotates both the work and the hob and causes the work head to move vertically at a relatively slow rate. After the work has been moved at the slow rate past the hob so that the latter has cut or hobbed the work, the stop 131 engages another switch within the housing 128, terminating operation of the cut motor and hence the rotation of the work and the hob and the relatively slow movement of the work head. The work is then removed, and, upon again depressing the start button, the rapid traverse motor is again energized moving the work head C rapidly back to its initial position, movement in this direction being terminated by the stop 130 engaging the last-mentioned switch within the housing 128. As mentioned above, the hob arbor is slowly shifted in an axial direction when the hob is rotating and, after the arbor has shifted to the maximum extent as determined by the setting of the control ring or nut 95, the switch 109 is actuated, thus lighting the lamp L, which is preferably mounted upon the control panel 121. If the machine be effecting a hobbing operation when the switch 109 is operated, the machine does not stop at this time, but only after the operation has been completed, whereupon the hob may be replaced and the operations repeated as above described.

The electrical control system for the machine is so arranged that the cycles of the operation of the machine may be started with the work head C in either of its normally extreme vertical positions. That is to say, with the switch 125 set in one position, circuits are set up to effect the cycle of operations such that the work head C moves in an upward direction during the hobbing operation, and with the switch 125 set in the other position thereof, the work head C is moved downwardly during the hobbing operation. The selector switch 124 controls the direction of rotation of the motor driving the hob arbor and the work so that rotation in either direction may be effected as desired. Therefore it will be apparent that either "climb" hobbing or "conventional" hobbing can be effected in either direction of movement of the work head by suitable setting of the switches 124 and 125, and by inserting or removing an idler gear in the work spindle drive change gears or in the feed change gears of the mechanism, as is described in the previously-mentioned Patent 2,307,428.

The switch 127 enables the feed of the work to be automatically terminated a predetermined time before the stopping of the hob arbor in order to provide for "clean up" of the work, while the switch 126 enables the feeding movement of the machine to be terminated at any time without interrupting the rotation of the hob and work.

This latter feature is advantageous in setting up the machine or for checking its operation. Moreover, the machine is provided with the usual suitable safety switches, such as the previously-mentioned overtravel limit switch for the work head to prevent the latter from being moved beyond a predetermined point in the event the switch operated by the stops 130, 131 should fail to operate.

It should therefore now be apparent that the invention provides a novel and improved hobbing machine employing axial shift of the hob arbor at a relatively slow rate and with a minimum of gears in an extremely compact arrangement. Moreover, the mechanism for controlling the machine in accordance with the hob shift is easily accessible and may be readily adjusted to vary the predetermined distance of shift that may occur before actuation of the switch 109. In addition the gearing is so constructed and arranged that it may be readily replaced by trains having gears of different ratios to effect different rates of axial shift of the hob. Furthermore, the said mechanism is so located adjacent the end of the hob head that no increase is required in the size of the latter adjacent the hob carried by the head so that the head may be readily adjusted angularly without interference with the work head or the work supported therein.

While the preferred embodiment of the invention has been described in considerable detail, it is to be understood that this is by way of example only and that the invention is not limited to the particular details shown and described.

Having thus described the invention, I claim:

1. In a hob head for a hobbing machine, a hob arbor, means journalling said hob arbor for rotary and axial movements, driving means operatively connected with said hob arbor to rotate the same, a member rotatably supported concentrically with said hob arbor and having a threaded engagement with said hob arbor for rotation therewith and relative thereto, means preventing axial movement of said member, a first gear supported coaxially of said hob arbor and connected thereto for rotation therewith, a second gear of substantially the same diameter as said first gear supported coaxially of said hob arbor and connected to said member for rotation therewith, and a pair of gears having substantially the same diameter connected to rotate together about a common axis with the gears of said pair meshing respectively with said first and second gears, the diametral pitches of said pairs of connected gears being unequal while the meshing gears have the same diametral pitch.

2. The combination as defined in claim 1 and wherein the difference between the diametral pitches of said pair of gears is equal to a small integer.

References Cited in the file of this patent
UNITED STATES PATENTS

| | | |
|---|---|---|
| 311,709 | Anderson | Feb. 3, 1885 |
| 1,061,343 | Wayte | May 13, 1913 |
| 1,391,542 | Hamel | Sept. 20, 1921 |
| 1,886,652 | De Koning | Nov. 8, 1932 |
| 2,398,841 | Morris | Apr. 28, 1946 |
| 2,481,974 | Bradner | Sept. 13, 1949 |
| 2,537,967 | Carlin | Jan. 16, 1951 |